May 19, 1953
A. BOURG
2,638,729
WHEEL SUPPORTING SPINDLE FOR ROTATING
CUTTING REEL TYPE MOWERS
Filed Sept. 23, 1949
2 Sheets-Sheet 2
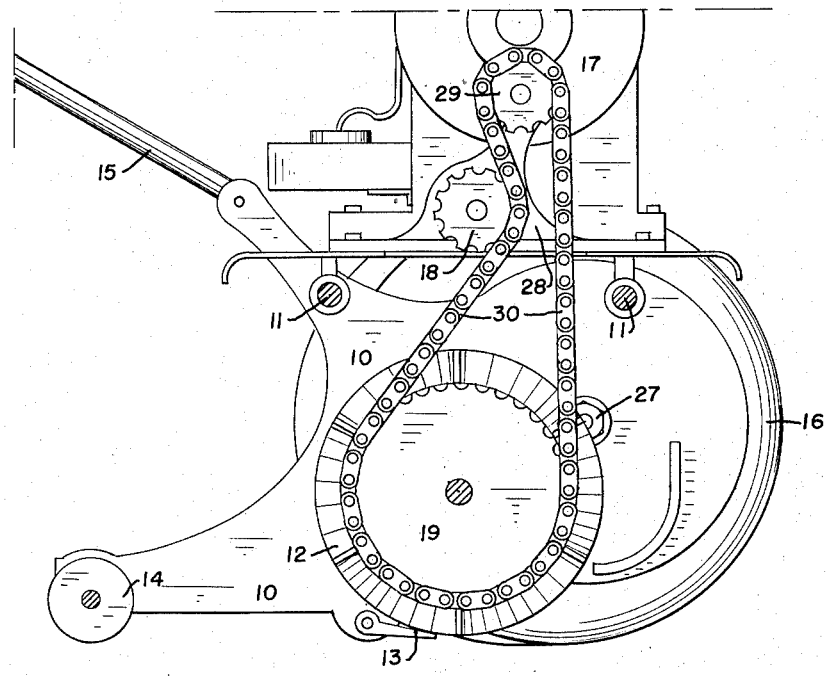
Fig. 3
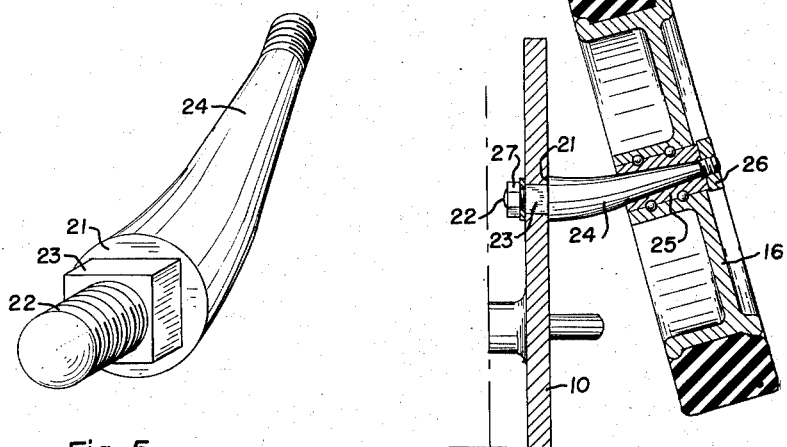
Fig. 5
Fig. 4
INVENTOR.
ALEX BOURG
BY
ATTORNEY Patented May 19, 1953

2,638,729

UNITED STATES PATENT OFFICE 2,638,729

WHEEL SUPPORTING SPINDLE FOR ROTATING CUTTING REEL TYPE MOWERS

Alex Bourg, Littleton, Colo.

Application September 23, 1949, Serial No. 117,430

1 Claim. (Cl. 56—249)

This invention relates to powered, manually-propelled apparatus employable to clear light falls of snow from walks, drives, courts, aprons and the like, and more particularly to such apparatus characterized by alternative applicability to the mowing of lawns, and has as an object to provide an improved construction, arrangement, and organization of elements constituting a low-cost, efficient snow plow of high utility and convenience.

A further object of the invention is to provide an improved conversion of conventional powered lawn mower constructions into efficient snow-clearing apparatus.

A further object of the invention is to provide improved means applicable to conventional powered lawn mowers for enhancement of mower effectiveness and alternative adaptation of the unit to use in the clearing of snow.

With the foregoing and other objects in view, my invention consists in the construction, arrangement, and combination of elements as hereinafter set forth, pointed out in my claim, and illustrated by the accompanying drawings, in which—

Figure 1:
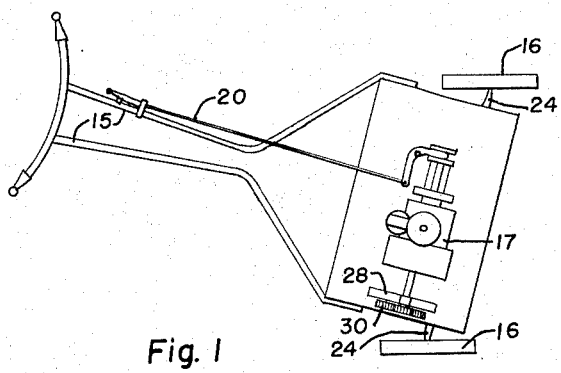
Figure 2:
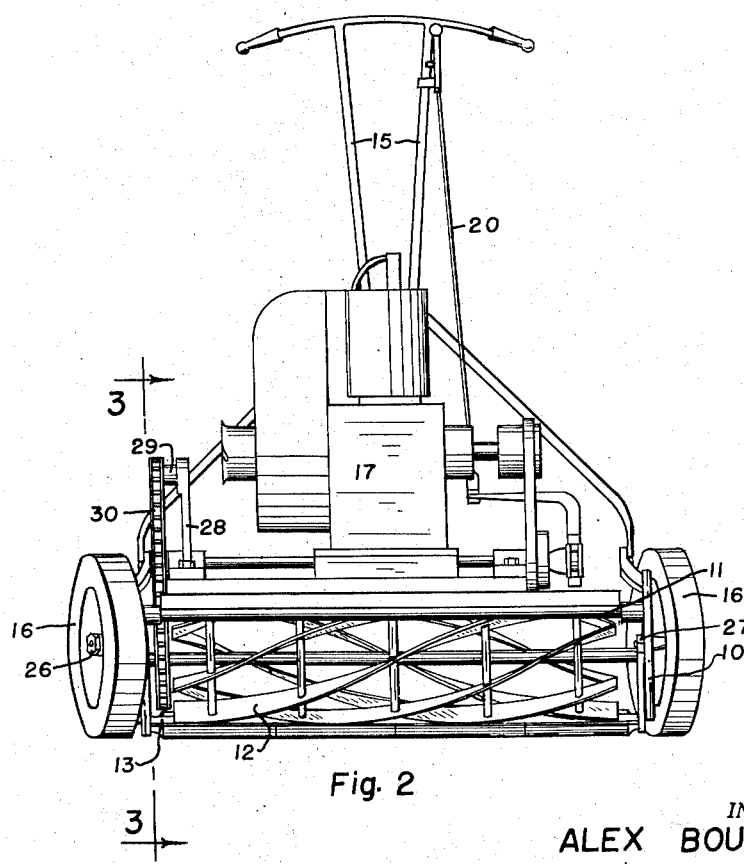

Figure 1 is a somewhat diagrammatic plan view of a conventional powered lawn mower as modified to embody and give effect to the principles of the invention. Figure 2 is a front elevation, on an enlarged scale, of the apparatus shown in Figure 1. Figure 3 is a fragmentary, detail section, on a further enlarged scale, taken substantially on the indicated line 3—3 of Figure 2. Figure 4 is a fragmentary, transverse section through a wheel mounting characteristic of the invention. Figure 5 is an isometric view of an adapter spindle employed in the wheel mounting according to Figure 4.

In a variety of functionally-equivalent constructions and arrangements, manually-dirigible, powered lawn mowers are commonly available and extensively in use. Conventional mowers of the type herein discussed include vertically-disposed, spacedly-parallel frame plates 10 rigidly interconnected by means of spacer struts 11, a spiral-bladed, cutter reel 12 mounted in and revoluble about its axis between the plates 10, a cutter bar 13 adjustably bridging between the plates 10 for coaction with the reel 12, a ground-engaging roller 14 adjustably bridging between trailing portions of the plates 10 in spaced parallelism with the reel 12 axis for regulation of the reel altitudinal disposition, a handle assembly 15 hinged for oscillation in a vertical arc to and extending rearwardly from the plates 10, ground-engaging wheels 16 exteriorly adjacent and supporting the plates 10 in rotatable engagement with spindles 24 extending from said plates in axial parallelism with the reel 12, whereby said reel is operative about an axis perpendicular to the assembly travel path, a prime mover, such as an internal combustion engine 17, platform-supported from and above the struts 11, a drive from the powered sprocket 18 of the engine 17 to a reel end sprocket 19 effective to rotate said reel in opposition to the cutter bar 13 leading edge and in a direction the same as wheel 16 rotation during forward travel of the assembly, and appropriate engine and drive controls 20 carried by the handle assembly 15 within convenient reach of an operator. Certain of the conventional powered mower units are arranged for application of power from the engine 17 to and for unit propulsive rotation of the wheels 16, while in other conventional constructions such propulsive power drive is absent to condition the unit for manual propulsion as well as manual direction, and the improvements of the instant invention are applicable with identical effect to both the power-propelled and manually-propelled conventional constructions.

Reorganization of conventional powered mower units of the type shown and described for enhancement of unit effectiveness in accordance with the principles of the invention is readily accomplished through a simple modification of the wheel 16 mountings on and relative to the plates 10 whereby said wheels are disposed to travel, one in advance of the other, along spacedly parallel paths non-perpendicular to the reel 12 axis, thereby to operatively present said reel and its associated cutter bar 13 at an inclination to the unit travel path for development of a biased, or slicing, reel cutting action on the grass or analogous material against which the reel is advanced and a delivery of cuttings rearwardly of the unit at an inclination with and to one side of the unit travel path, both of which developments experience has demonstrated to be of advantage.

Modification of the conventional mower wheel mountings in the manner illustrated and for the purposes hereinabove set forth may be readily accomplished through the substitution of an adapter spindle of the type shown in Figure 5 for the conventional wheel 16 spindles, a pair of like adapter spindles serving to condition each mower unit. Each adapter spindle is an integral unit formed with a shank end having a circular base 21 engageable against the outer face of a plate 10, a threaded stem 22 outstanding centrally and perpendicularly from said base, and a non-circular boss 23 symmetrically marking the junction of said stem and base and adapted for seated registration within a non-circular opening through the plate 10 at the point of conventional spindle engagement with the plate. The end of the adapter spindle remote from the stem 22 is tapered, or otherwise worked, to provide a body 24 adapted for the reception and operative mounting of the wheel 16 bearing 25 which is held to the spindle body in a usual manner by means of a nut 26 threadedly cooperating with the free end of the body 24, and the portion of the adapter spindle between the base 21 and body 24 is appropriately worked and longitudinally curved to dispose the body 24 axis at an angle to the stem 22 axis corresponding to the angle desired between the wheel travel path and the reel 12 axis. The non-circular, spindle-mounting openings through the plates 10 and the non-circular facets of the boss 23 are so correlated as to interengage in an adapter spindle mounting on either plate such as disposes the axis of the spindle body 24 in a horizontal plane paralleling that of the unit ground-engaging elements and directs the spindle free end, selectively, to either lead or trail in the direction of unit advance and relative to the reel 12 axis; each adapter spindle being susceptible of mounting on a given plate 10 in either of two positions, separated by one hundred and eighty degrees of spindle shank rotation, for selective determination of the leading or trailing disposition of the spindle free end. With the adapter spindle boss 23 seated in the plate 10 non-circular opening, the base 21 bears against the plate exterior face and the stem 22 projects inwardly beyond the plate, so that a nut 27 engaged with said stem may be tightened against the plate inner face to fix and secure the adapter spindle in desired operative position.

Utilizing the adapter spindles to give effect to the principles of the invention, one of said spindles is mounted on one of the mower unit plates 10 with its free end advanced in the direction of unit travel and the other spindle is secured to the other unit plate 10 with its free end trailing in the direction of unit travel, thereby disposing the spindle body 24 axes in spaced parallelism and at corresponding angles relative to the reel 12 axis, so that when the wheels 16 are operatively mounted on the so-arranged spindle bodies said wheels are disposed to travel in parallel paths, one in advance of the other, and to support the reel 12 with its axis inclined to and between said wheel paths. Obviously, rotation of the adapter spindles a half turn in and relative to their respective plate mountings is effective to reverse the reel axis inclination relative to the unit travel path and so selectively determine the direction of cuttings discharge laterally of the travel path.

Reorganization of conventional mower units for use in the clearing of snow involves the use of the adapter spindles as above described for development of a unit travel path inclined relative to the reel 12 axis, whereby to effect a snow discharge to one side of the unit travel path, and, in addition, reversal in the direction of reel 12 power drive, whereby to apply the reel blade travel to a displacement of snow cover forwardly and laterally of the unit as the latter is advanced. Reversal in the direction of reel drive is readily accomplished, without onerous alteration in the engine 17 mounting or expensive utilization of gear box additions, through the provision of a bracket 28 bolted to the engine-supporting platform adjacent the driven sprocket 18 and an idler sprocket 29 rotatably carried by said sprocket above and coplanar with said sprocket 18, so that, through a simple extension in the length of the chain 30 constituting the drive to the reel sprocket 19, the drive chain may be side-engaged with the power sprocket 18 and about the sprocket 29, as shown in Figure 3, to effect a powered reel rotation opposite to that obtaining when the sprocket 18 is directly chain-connected with the sprocket 19.

As is readily apparent, conventional powered mowers of the manually-dirigible type may be conveniently conditioned through the use of the adapter spindles for travel in mowing operations with the reel axis inclined to the path of unit travel and for consequent delivery of cuttings laterally of the travel path, and the so-conditioned units may be adapted to use in the clearing of snow by simple reversal of the direction of reel rotation, in the manner shown and described. Reversibility of the adapter spindles in their respective mountings permits selective reversal of the direction of reel axis inclination and consequent full utility of the invention, it being feasible and expedient to propel and direct the modified unit with the handle assembly 15 in usual relation with the reel, regardless of the direction of wheel axis inclination.

Since many changes, variations, and modifications in the form, construction, and arrangement of the elements shown and described may be had without departing from the spirit of my invention, I wish to be understood as being limited solely by the scope of the appended claim, rather than by any details of the illustrative showing and foregoing description.

I claim as my invention:

Adapter means for association with wheel-supported, reel-type, powered lawn mowers having spacedly-parallel frame plates vertically disposed at the opposite ends of the reel, whereby to condition the mower for ejection of material engaged by the reel laterally of and at an inclination relative to the mower travel path, said means comprising like spindles removably, adjustably, and replaceably engageable with and to outstand oppositely from said frame plates in revolubly supporting relation with the mower wheels, each of said spindles being constituted in an integral unit as a shank end characterized by a circular base seatable against the outer face of a frame plate, a threaded stem projecting centrally and perpendicularly from said base, a non-circular boss symmetrically marking the junction of said base and stem for registration within a correspondingly non-circular hole through the frame plate, and a wheel-mounting spindle body extending from said base in a direction opposite to the stem projection with its axis in angular relation to that of said stem; together with a nut threadedly cooperable on said stem to clamp said base to the frame plate and to hold said boss non-rotatably seated in the frame plate in a position of relative adjustment determinative of the direction of spindle body inclination relative to the mower reel axis.

ALEX BOURG.

References Cited in the file of this patent

UNITED STATES PATENTS

| Number | Name | Date |
| --- | --- | --- |
| 762,514 | Coates | June 14, 1904 |
| 796,811 | Coldwell | Aug. 8, 1905 |
| 891,867 | Secrest | June 30, 1908 |
| 1,745,903 | Millar | Feb. 4, 1930 |
| 2,051,443 | Gravely | Aug. 18, 1936 |
| 2,145,738 | Sandberg | Jan. 31, 1939 |
| 2,171,075 | Blazier | Aug. 29, 1939 |
| 2,176,175 | George | Oct. 7, 1939 |
| 2,204,254 | Moyer | June 11, 1940 |
| 2,431,580 | Orr | Nov. 25, 1947 |
| 2,445,797 | Moore | July 27, 1948 |
| 2,566,724 | Heil | Sept. 4, 1951 |